UNITED STATES PATENT OFFICE.

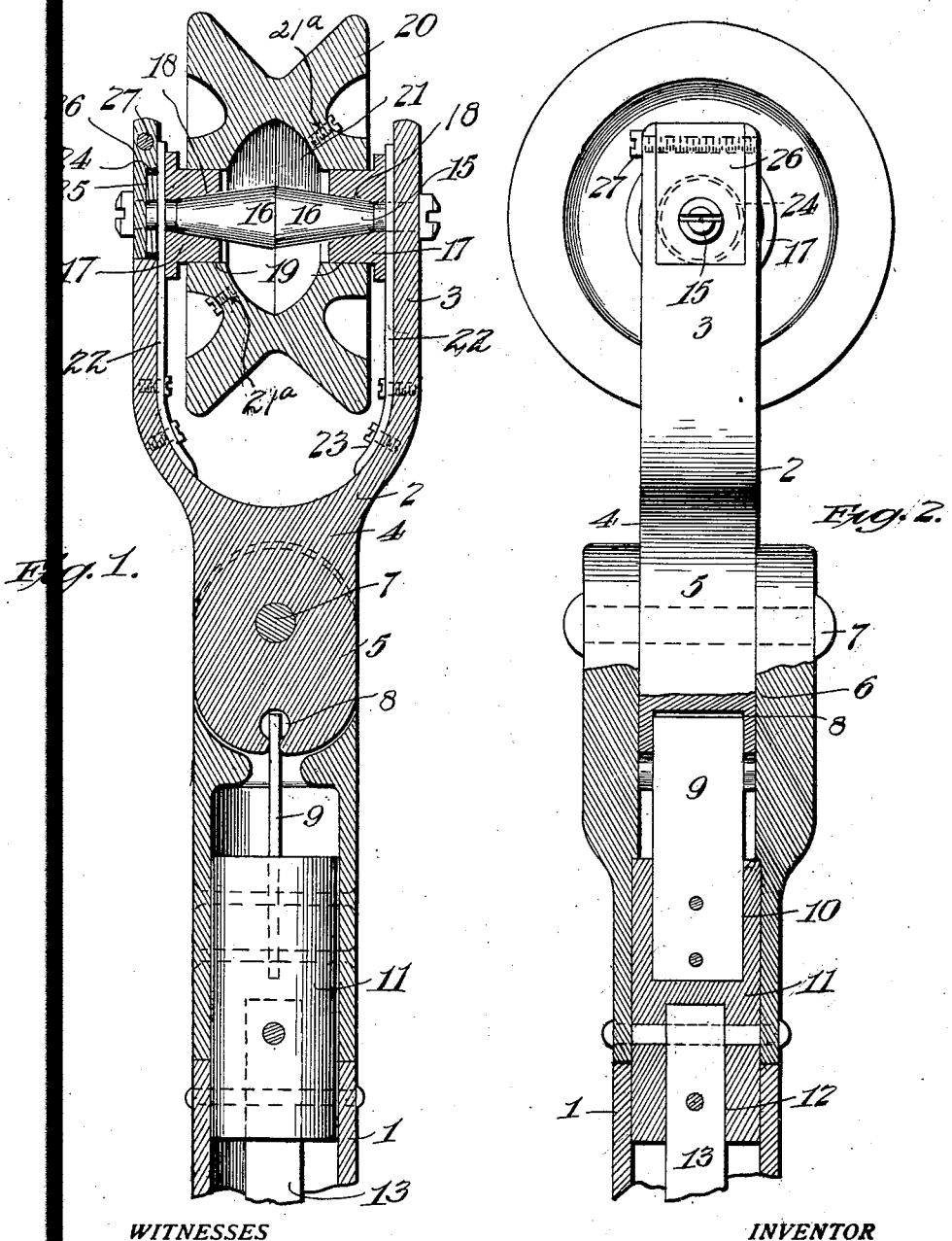

WILLIAM F. SWOVELAND, OF ALTOONA, PENNSYLVANIA, ASSIGNOR OF ONE-HALF TO W. C. FLETCHER, OF ALTOONA, PENNSYLVANIA.

WHEEL-MOUNTING.

1,007,315. Specification of Letters Patent. Patented Oct. 31, 1911.

Application filed June 14, 1909. Serial No. 502,106.

*To all whom it may concern:*

Be it known that I, WILLIAM F. SWOVELAND, a citizen of the United States, residing at Altoona, in the county of Blair and State of Pennsylvania, have invented certain new and useful Improvements in Wheel-Mountings, of which the following is a specification.

This invention relates to an improvement in trolleys, and has special reference to certain novel and practical improvements in the trolley wheel mounting whereby the same will be self lubricating.

To this end the invention provides a novel form of self-lubricating bearing involving means for automatically taking up wear and maintaining a true and tight bearing.

With these and other objects in view, which will more readily appear to those skilled in the art as the nature of the invention is better understood, the same consists in the novel construction, combination, and arrangement of parts hereinafter more fully described, illustrated and claimed.

The essential features of the invention are necessarily susceptible to structural modification, but a preferred embodiment of the invention is shown in the accompanying drawings, in which:

Figure 1 is a longitudinal sectional view of a trolley embodying the improvements contemplated therein. Fig. 2 is a side elevation partly in section of the same.

Like reference designate corresponding parts in the several figures of the drawings.

In carrying out the invention, the usual trolley pole 1 is employed with which is associated the harp 2 having parallel side bearing arms 3 and provided at its closed end with a stem portion 4 having a pivot head 5 held in a bifurcation 6 at the upper end of the trolley pole by means of a pivot pin or bolt 7. Below the pivot pin or bolt 7 the pivot head 5 of the harp is provided with a keeper notch 8 within which is loosely interlocked the free end of a trolley holding spring 9. This spring is preferably a flat leaf spring and the short end thereof is secured fast in a socket 10 provided in one end of a brass supporting plug 11 which is rigidly fitted within the trolley pole and is provided in its opposite end with a conductor socket 12 in which is secured one end of the conductor or wire 13 which extends through the trolley pole and connects with the motor equipment.

The side bearing arms 3 of the harp support a transverse double cone axle 15 having the separate opposite conical portions 16, 16, upon which are rotatably fitted the self-adjusting bearing bushings 17. These bearing bushings 17 are provided with interior taper openings 18 registering with the conical portions 16, and said bearing bushings also register and slidably engage with the side bearing openings 19 provided in the opposite sides of the trolley wheel 20. The said bushings are suitably interlocked with the wheel so as to rotate therewith and at the same time be capable of sliding therein. This wheel is preferably of integral formation and is provided with an interior lubricant chamber 21 with which communicates suitably arranged plugged filling openings 21$^a$.

Flat take-up springs 22 are secured fast at their lower ends, as at 23, to the inner side and lower end portions of the bearing arms 3, and the free ends of said springs are arranged to bear and exert an inward pressure against the outer sides of the bearing cones 17. To supplement this action, there is employed an auxiliary coiled pressure spring 24 seated in a spring socket 25 formed in the inner side of a detachable cap plate section 26 held in the outer end of one of the side bearing arms 3 by means of a retaining screw 27.

I claim:

In a device of the character described, the support carrying a double cone axle, a wheel having an interior lubricant chamber and side bearing openings, self-adjusting bearing bushings rotatable with the wheels, said bushings engaging over the conical portions of the axle and fitting in said bearing openings, flat take-up springs arranged to exert an inward stress on said cones, and an auxiliary coiled pressure spring arranged at one side of one of the flat springs.

In testimony whereof I hereunto affix my signature in the presence of two witnesses.

WILLIAM F. SWOVELAND.

Witnesses:
P. M. SWANGER,
W. C. FLETCHER.